United States Patent [19]

Dischert et al.

[11] Patent Number: 4,673,978
[45] Date of Patent: Jun. 16, 1987

[54] PROGRESSIVE SCAN PROCESSOR WITH PLURAL FREQUENCY BAND INTERPOLATION

[75] Inventors: Robert A. Dischert, Burlington, N.J.;
Robert J. Topper, Hatboro, Pa.;
William M. Shyu, Edison, N.J.

[73] Assignee: RCA Corporation, Princeton, N.J.

[21] Appl. No.: 866,484

[22] Filed: May 23, 1986

[51] Int. Cl.[4] .............................................. H04N 7/01
[52] U.S. Cl. ...................................... 358/140; 358/11
[58] Field of Search .................................. 358/140, 11

[56] References Cited

U.S. PATENT DOCUMENTS

| | | | |
|---|---|---|---|
| 4,400,719 | 8/1983 | Powers | 358/21 R |
| 4,415,931 | 11/1983 | Dischert | 358/242 |
| 4,521,802 | 6/1985 | Ikeda | 358/140 |
| 4,524,379 | 6/1985 | Okada | 358/11 |

FOREIGN PATENT DOCUMENTS 58-79379  5/1983  Japan .

*Primary Examiner*—Howard W. Britton
*Attorney, Agent, or Firm*—P. J. Rasmussen; P. M. Emanuel; R. G. Coalter

[57] ABSTRACT

A speed-up circuit time compresses and interlaces field delayed and interpolated lines of a video input signal for display in progressive scan fashion. The interpolated lines are produced by adding low and high frequency components derived from the video input signal. The low frequency component is produced by frame-combing and low pass filtering the input signal. The high frequency component is obtained by field delaying, line comb filtering and low pass filtering the input signal. The combined low and high frequency components are spatially and temporally coincident thereby reducing the visibility of motion artifacts (double images) on the display.

5 Claims, 7 Drawing Figures

PROGRESSIVE SCAN PROCESSOR WITH PLURAL FREQUENCY BAND INTERPOLATION

FIELD OF THE INVENTION

This invention relates to video signal processing and particularly to processors for converting interlaced video signals to non-interlaced form to provide a progressively scanned image in which the number of horizontal lines is doubled so as to reduce the visibility of displayed line structure.

BACKGROUND OF THE INVENTION

The visibility of raster lines in a television display is a function of the size and brightness of the display. Large bright displays tend to appear coarse. Progressive scan displays have been proposed which minimize this problem by generating additional lines for the display. An example, wherein the added lines are replicas of the original scan lines, is described by R. A. Dischert in U.S. Pat. No. 4,415,931 entitled TELEVISION DISPLAY WITH DOUBLED HORIZONTAL LINES which issued Nov. 15, 1983. In another form of progressive scan system, the "extra" lines for the display are obtained by interpolation of adjacent horizontal lines of the incoming video signal as described, for example, by K. H. Powers in U.S. Pat. No. 4,400,719 entitled TELEVISION DISPLAY SYSTEM WITH REDUCED LINE SCAN ARTIFACTS which issued Aug. 23, 1983.

It has been recognized by Powers that a superior progressive scan image may be obtained in cases where there is no significant image motion by delaying the video signal by one field and interleaving time compressed lines of the incoming and field delayed video signals. In this way all 525 lines of an interlaced frame (NTSC assumed) are available for display during each field period thereby avoiding the loss of vertical resolution characteristic of conventional line interpolators. When motion occurs, however, the temporal difference (1/60 second for NTSC, 1/50 second for PAL) between the undelayed and the field delayed lines causes visible artifacts to be produced (e.g., double images, serrated edges, etc.).

Another approach to producing progressive scan conversion by field processing is described by Tanaka in Japanese Application Kokai (Laid Open) No. Sho 58-79379 entitled A TELEVISION RECEIVER published (laid open) on May 13, 1983. As in the field progressive scan system of Powers, a progressive scan image is produced by time compressing and interleaving lines of a current field with lines of a previous field obtained from a field memory. In the Tanaka system the storage requirement of the field memory is reduced by a factor of one-half by low pass filtering the video input signal before storing it in the field memory. The stored low frequency lines are recovered, time compressed and added to high frequency lines obtained by speeding-up (time compressing) and high-pass filtering the video input signal to generate interpolated interstitial or "extra" lines for display. The interpolated lines are then interleaved with lines of the time compressed non-field delayed video input signal to form the complete progressive scan output signal. In an embodiment of the Tanaka system the time compressed non-field delayed high frequency lines are also subjected to vertical interpolation after speed-up and before high pass filtering.

SUMMARY OF THE INVENTION

In accordance with an aspect of the invention, it is herein recognized that field progressive scan systems which process interpolated lines for display in two frequency bands provide a desirable "softening" of the double images produced during motion. Edges look better because high frequency components of interpolated lines are temporally aligned with high frequency components of the "real" (i.e., incoming) lines. Low frequency components of interpolated lines in such systems, nevertheless exhibit temporal asymmetry with low frequency components of real lines and thus tend to cause low frequency ghosting during motion. The present invention is directed to meeting the need for a progressive scan system having reduced motion artifacts.

A progressive scan processor embodying the invention includes an input means for receiving a video input signal having a given line rate. A first filter means, coupled to the input means, provides a frame interpolated video output signal and a field delayed video output signal. A second filter means, coupled to the first filter means, line comb filters the field delayed video output signal to provide a field delayed and line interpolated output signal having picture elements spatially and temporally aligned with corresponding picture elements of the frame interpolated video output signal. A circuit means, coupled to the first and second filter means, low pass filters the frame interpolated video output signal, high pass filters the field delayed and line interpolated video output signal and combines the resultant low-pass and high-pass filtered signals to form a resultant video output signal having said given line rate. A speed-up means, coupled to the circuit means and to the first filter means, time compresses the field delayed video output signal, time compresses the resultant video output signal and interleaves horizontal lines of the time compressed signals to form a progressive scan video output signal of double the given line rate of the video input signal.

BRIEF DESCRIPTION OF THE DRAWING

The invention is illustrated in the accompanying drawing wherein like elements are denoted by like reference designators and in which.

DETAILED DESCRIPTION

Figure 1:
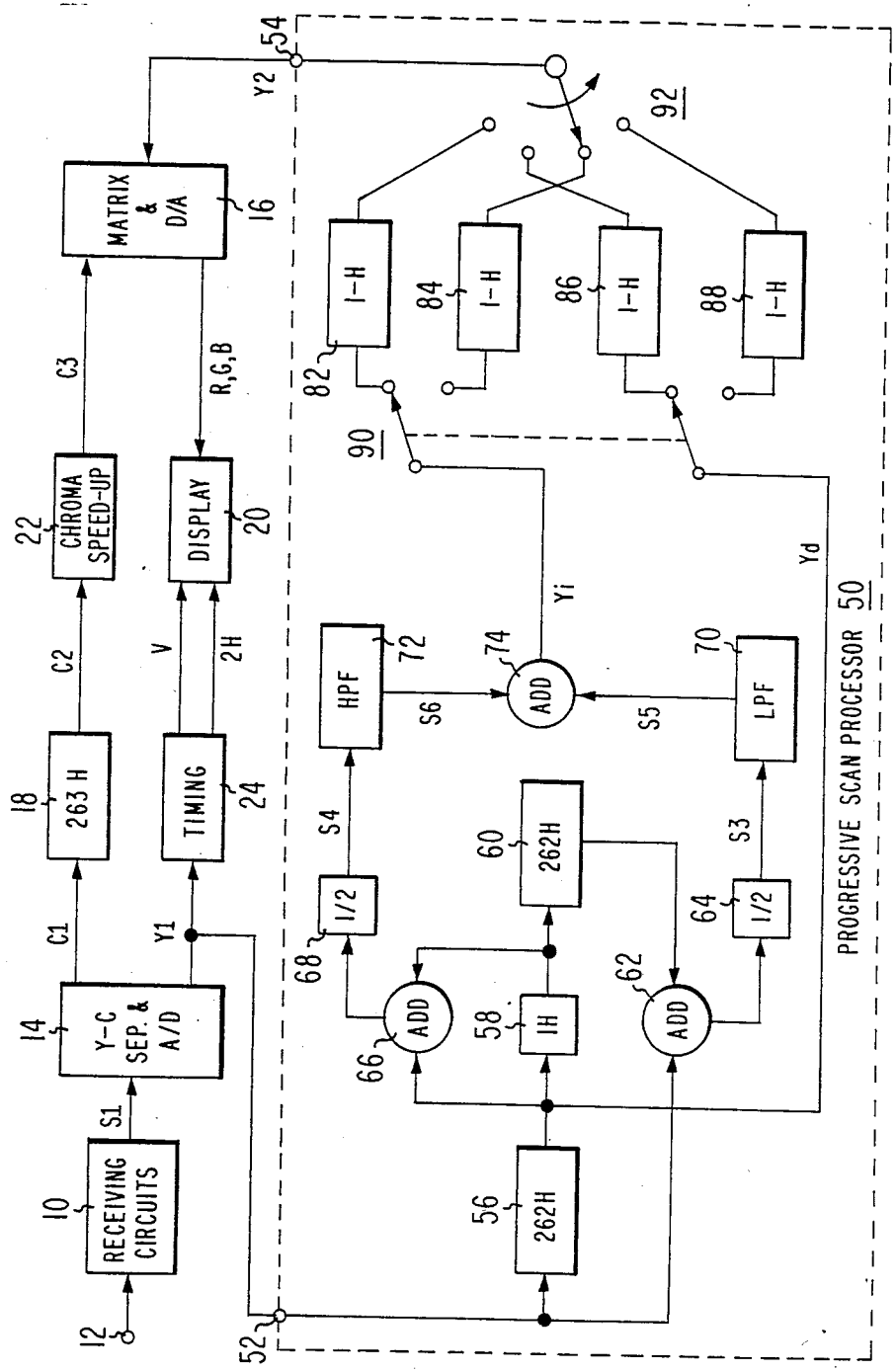
FIG. 1 is a block diagram of a television receiver embodying the invention.

The receiver of FIG. 1 comprises a receiving circuits unit 10 of conventional design having an input 12 for connection to an antenna or other suitable video RF source and an output for providing a baseband video output signal S1. For purposes of illustration, signal S1 will be assumed to be of the NTSC video format standard. The principles of the invention apply equally to video signals of other standards such as PAL or SECAM. Unit 10 provides functions such as RF tuning, IF amplification, video demodulation, etc. Unit 10 may be omitted when the receiver is used as a video monitor for sources having baseband video outputs (e.g., video tape recorders). Signal S1 is applied to a luminance/chrominance separator (Y/C) and analog-to-digital (A/D) conversion unit 14 of conventional design which provides separated and digitized luminance (Y1) and chrominance (C1) output signals. It is preferred that the separated signals be processed digitally to facilitate signal storage in conventional random access memories (RAMs). Alternatively, processing may be provided by analog memories (e.g., charge coupled devices) in which case conversion to digital form is not necessary.

The luminance signal Y1 is applied to input 52 of a progressive scan processor 50 (outlined in phantom) which converts the interlaced signal Y1 to non-interlaced progressive scan form having double the line rate of signal Y1 (as will be explained) and supplies the double line rate progressive video signal (Y2 at output 54) to a first input of a matrix and digital-to-analog converter unit 16. Chrominance signal C1 is delayed by 263 lines (H) in unit 18. This delay corresponds to the net delay imparted to the luminance signal passing through processor 50 so as to ensure proper registration of the luminance chrominance signals (Y2 and C3) when displayed on a display unit 20.

The delayed chrominance signal C2 is applied to a chrominance signal speed-up unit 22 which doubles the chrominance signal line rate. This may be done, for example, by storing each line of signal C2 in a memory and recovering each stored line two times in one line interval as described, for example, in the aforementioned Dischert patent. Unit 16 converts the double line rate chrominance (C3) and luminance signals (Y2) to analog RGB form for display on unit 20 which is synchronized therewith by normal field rate timing signals V (59.94 Hz for NTSC) and "double line rate" timing signals 2H (31.468 KHz) supplied thereto by a timing unit 24. Since the line rate has been doubled and the field rate is the standard NTSC value, display 20 provides double the number of lines per field as that provided by a conventional display and so the raster line structure is less visible.

Progressive scan processor 50, embodying the invention, includes a cascade connection of delay units 56–60 coupled to terminal 52 and having delays of 262H, 1H and 262H lines, respectively ("H" signifies horizontal lines in the drawing). An adder 62 is coupled to the input of unit 56 and to the output of unit 60 and an attenuator 64 having an attenuation factor of one-half (½) is coupled to the output of adder 62. In combination, elements 56–64 form a frame comb filter there by producing at the output of attenuator 64 a luminance signal S3 equal to the average of lines two fields (one frame) apart. The effective delay of the frame averaged signal S3, relative to the luma input signal Y1, is 262.5 lines or 0.5 lines relative to the field delayed luminance signal Yd produced at the output of delay unit 56.

The input and output signals of 1-H delay unit 58 are applied to an adder 66 and the resultant sum signal is attenuated by one-half in attenuator 68 to provide a line averaged output signal S4. The delay of the line averaged or "vertically interpolated" signal S4 is one-half line relative to the field delayed signal Yd at the output of delay unit 56 or 262.5 lines relative to signal Y1. Since the delays have been selected as described, the frame averaged signal S3 is spatially and temporally aligned with the field-delayed line-averaged signal S4 and both lag the field delayed luma signal Yd by one-half-line.

Figure 4:
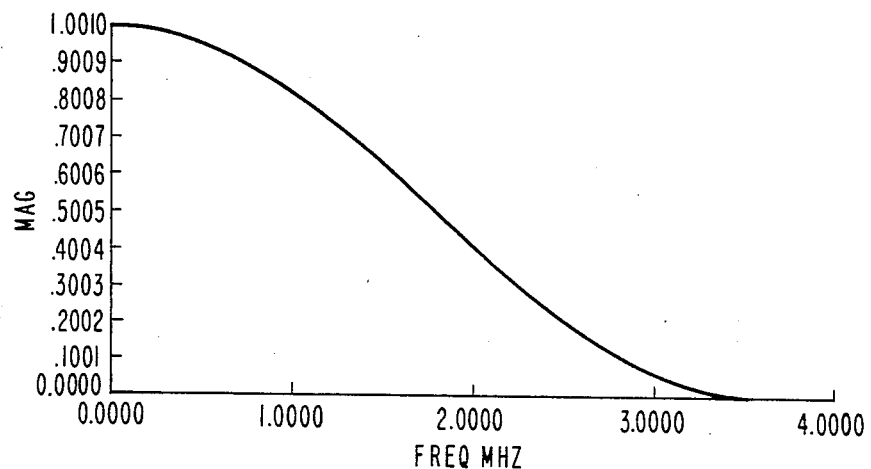
FIGS. 4 and 5 are diagram illustrations complementary filter characteristics used in the receiver of FIG. 1.
Figure 5:
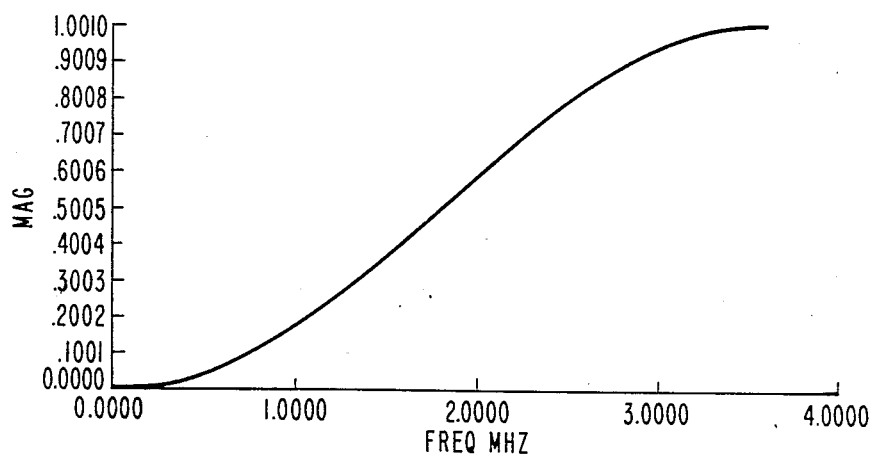

Signals S3 and S4 are applied by means of complementary low-pass and high pass filters 70 and 72, respectfully, to an adder 74 to generate an interpolated video output signal Yi. Each line of a given field of Yi includes a low frequency component (S5) taken from the corresponding lines of the immediately preceding and following fields and includes a high frequency component (S6) taken from the preceding and following lines of the given field. FIGS. 4 and 5 illustrate suitable low-pass and high-pass complementary characteristics of filters 70 and 72, respectively. In FIG. 4 the response of low pass filter 70 is unity at DC, minus 6 dB at one-half the color subcarrier frequency (about 1.79 MHz for NTSC) and is essentially zero at the color subcarrier frequency (about 3.58 MHz). The response of high pass filter 72 is the exact complement of that of low-pass filter 70. Specifically, in FIG. 5 the high pass filter 72 has zero response at DC, half amplitude response at half the color subcarrier frequency and unity response at the color subcarrier frequency. The sum of the amplitude responses of filters 70 and 72 is unity at all frequencies in the luminance signal band from DC to about 4 MHz.

Figure 2:
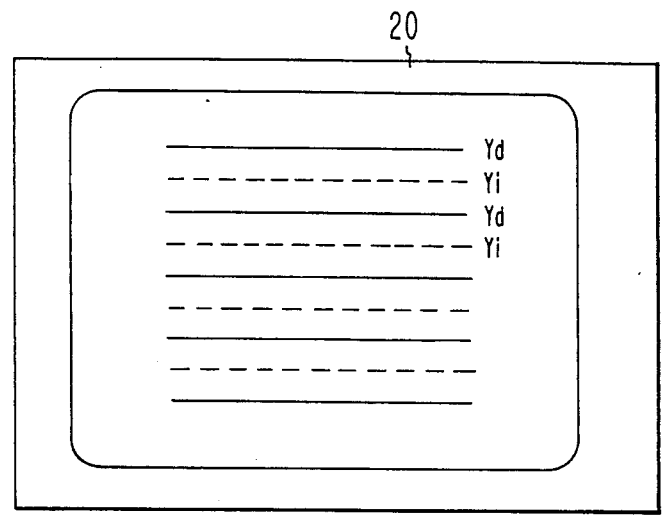
FIGS. 2 and 3 illustrate spatial and temporal relationships of video line structure produced by the receiver of FIG. 1.

The interpolated signal Yi and the field delayed signal Yd are each of the same line rate (about 60 Hz) as the interlaced video input signal Y1. The remaining elements of processor 50 form a "speed-up" circuit which time compresses signals Yd and Yi and interleaves the time compressed signals to produce a progressive scan signal for display 20 having 525 lines per field with Yi and Yd alternating from line to line as shown generally in FIG. 2. The number of lines actually displayed is less (about 482) to allow for blanking during the vertical interval. The speed-up circuit comprises four 1-H (one line) memories 82–88 and a pair of input and output control switches 90 and 92, respectively. During one line interval switch 90 stores Yi and Yd in memories 82 and 86 at a given write clock rate. Concurrently, switch 92 sequentially recovers the previously stored lines of Yi and Yd from memories 84 and 88 with a read clock rate double the write clock rate. During the next line interval storage is in memories 84 and 88 and recovery is from memories 82 and 86. This cycle repeats thereby producing the time compressed and interleaved lines of Yi and Yd shown in FIG. 2.

Figure 3:
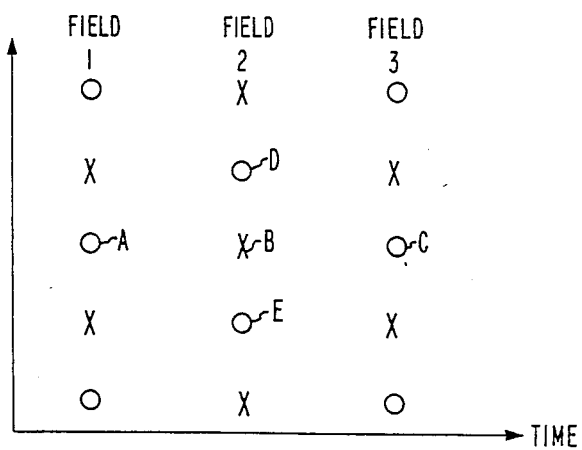

FIG. 3 illustrates the spatial-temporal relationships of the field delayed or "real" lines Yd (indicated by circles) and the interpolated lines Yi (indicated by crosses) for three fields of the progressive scan signal Y2 produced by processor 50. Each interpolated line, such as line B of field 2, is comprised of a low frequency component taken from the average of corresponding lines (A+C)/2 of the preceding and following fields and a high frequency component taken from the average (D+E)/2 of the immediately preceding and following lines. It will be noted that there is both spatial (vertical) symmetry and temporal (field-to-field) symmetry. If motion occurs there is no effect on the high frequency components of the interpolated line B because these components are always taken from the same field as the "real" (field delayed) signal. A motion artifact will be produced for low frequency components of line B. However, the magnitude of the low frequency motion artifact will be one-half of the magnitude of what ever change occurs because of the averaging of lines A and C. For example, when line A of field 1 is black and line C of field 3 is white, there will be a 100 IRE unit change in luminance level. The interpolated line B which is being displayed, however, will have a low frequency component of only 50 IRE units (0+100)/2. Thus, under worst case conditions only low frequency ghosts (double images) of moving objects can occur and the brightest low frequency ghost is only a shade of grey, and is never more than 50 IRE units or half the amplitude of the low frequency change.

Considering FIGS. 4 and 5 again, it is a feature of the invention that filters 70 and 72 have amplitude response characteristics that are complementary throughout the luminance signal pass-band. By "complementary" it is meant that the sum of the amplitude v. frequency characteristics is substantially constant. As shown, the curves of FIGS. 4 and 5 add to unity at all frequencies from DC to about 4 MHz. The high pass filter 72 is peaked at the color subcarrier frequency (3.58 MHz) but the droop at the high end of the luminance band is not significant.

The use of complementary filters avoids distortion of the interpolated luminance signal Yi which otherwise would occur due to the dual band processing. If filters 70 and 72 were not complementary, visible artifacts will appear such as unwanted peaking or suppression of the vertical or the horizontal or diagonal detail of the interpolated line Yi. Moreover, such artifacts in the interpolated signal Yi tend to "stand out" when Yi is displayed because signal Yi is interleaved with the field delayed signal Yd on display 20.

Figure 6:
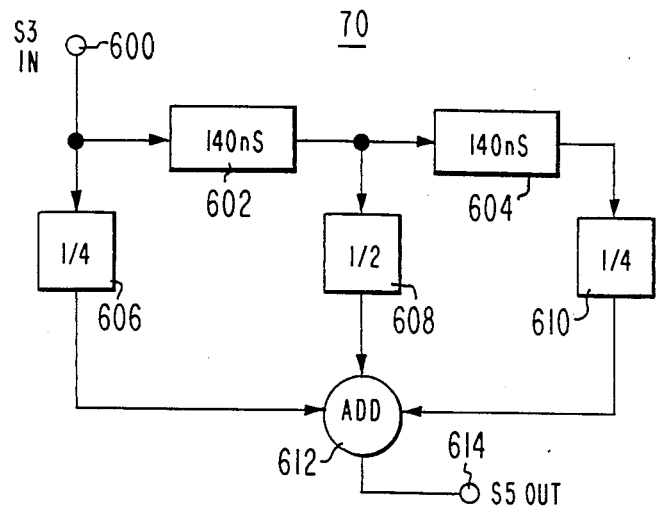
FIGS. 6 and 7 are block diagrams of transversal filters suitable for use as low-pass and high-pass filters in the receiver of FIG. 1.
Figure 7:
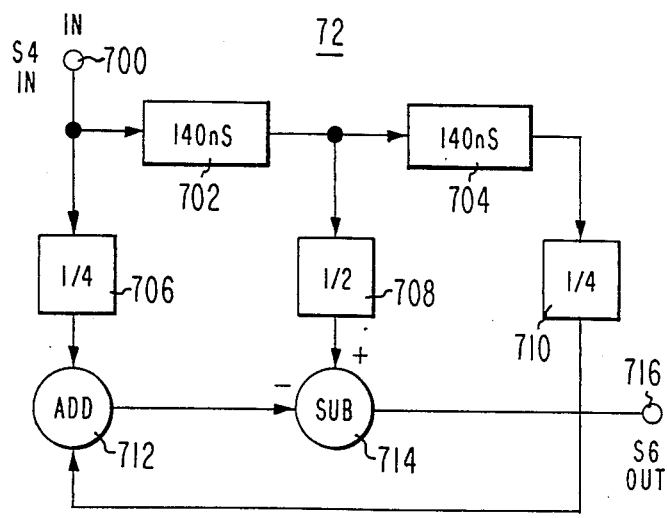

FIGS. 6 and 7 illustrate how the functions of low pass and high pass filters 70 and 72 may be implemented with transversal filters which, strictly speaking, are neither low-pass nor high-pass filters because they exhibit multiple pass-bands with no theoretical limit as to the number of periodic pass-band responses they provide. In the present invention, such filters function as low-pass and high-pass filters because the luminance input signal Y1 at terminal 52 is band limited to NTSC bandwidth both by the source which produced the signal so as to conform to NTSC standards (4.2 MHz luma bandwidth) and by the bandwidth limitations of the receiving circuits 10 and Y-C separator and A/D converter 14. Note particularly that if the invention is implemented with digital circuits that the A/D conversion performed in unit 14 requires bandwidth limitation to prevent sub-Nyquist sampling which otherwise would produce aliasing artifacts. Accordingly, even though the transversal filters of FIGS. 6 and 7 have periodic (repeated) passbands, they are limited in this specific application to only single pass-bands by circuits 10 and 14 and therefore function as low-pass and high-pass filters.

Considering now the details of the "low pass" filter 70 of FIG. 6, signal S3 at input 600 is delayed by 140 nano-seconds in delay unit 602 and by another 140 nano-seconds in delay unit 604. Attenuators 606 and 610 reduce the amplitude of the input signal S5 and the output signal of delay unit 604 by factors of one-quarter and attenuator 608 attenuates the output signal of delay unit 602 by one-half. Adder 612 adds the attenuated signals to produce the low pass filtered output signal S5 at terminal 614 having the transfer characteristics shown in FIG. 4. Since the total delay (280 nanoseconds) equals the period of the NTSC color subcarrier and all attenuated signals are added, the filter has a response zero at the color subcarrier frequency as shown. Signal repeat pass-bands characteristic of transversal filters generally are suppressed, as previously explained, because of bandwidth limitations of the NTSC input signal and the input circuitry. The "high pass" transversal filter of FIG. 7 is identical to the "low pass" transversal filter of FIG. 6 except for reversal of the signs of the quarter-valued attenuated signals. The sign reversal is implemented by adding the quarter-valued signals in adder 712 and subtracting the sum from the half-valued signal in subtractor 714. Since the delays and attenuation factors in filter 72 (FIG. 7) are exactly the same as in filter 70 (FIG. 6), the effect of changing the sign of the quarter-valued signals is to produce complementary characteristics as seen by comparing FIGS. 4 and 5.

What is claimed is:

1. A progressive scan processor, comprising:
   a source responsive to a video input signal for providing a field delayed video signal, a frame averaged video signal and a line averaged video signal having picture elements spatially and temporally coincident with corresponding picture elements of said frame averaged video signal;
   circuit means for low pass filtering said frame averaged signal, for high pass filtering said line averaged signal and for combining the filtered signals to form an interpolated signal; and
   speed-up means for time compressing said interpolated and field delayed signals and for interleaving the time compressed signals to form a video output signal of progressive scan form.

2. A progressive scan processor, comprising:
   input means for receiving a video input signal having a given line rate;
   first filter means coupled to said input means for providing a frame interpolated video output signal and a field delayed video output signal;
   second filter means coupled to said first filter means for line comb filtering said field delayed video output signal to provide a field delayed and line interpolated video output signal having picture elements spatially and temporally coincident with corresponding picture elements of said frame interpolated video output signal;
   circuit means coupled to said first and second filter means for low pass filtering said frame interpolated video output signal, for high pass filtering said field-delayed line-interpolated video output signal and for combining the resultant low-pass and high-pass filtered signals to form a resultant video output signal having said given line rate; and
   speed-up circuit means coupled to said circuit means and to said first filter means for time compressing said field delayed video output signal, for time compressing said resultant video output signal and for interleaving horizontal lines of the time compressed signals to form a progressive scan video output signal of double said given line rate.

3. A progressive scan processor as recited in claim 2 wherein said first filter means imparts a delay of one field to said frame interpolated video output signal and imparts a delay of one field less one half line to said field delayed video output signal and wherein said second filter means comprises a comb filter having an effective delay of one-half line.

4. A progressive scan processor as recited in claim 2 wherein:
   said circuit means includes low-pass and high pass filter means having complementary characteristics, each filter being of the transversal type and wherein said input means includes means for limiting the bandwidth of said video input signal to the bandwidth of a given broadcast standard.

5. A progressive scan processor, comprising:

delay means having an input for receiving a video input signal of a given line rate and having a first output for providing a first video output signal delayed by one field interval less one half-line, having a second output for providing a second video output signal delayed by one field interval plus one half-line and having a third output for providing a third video output signal delayed by one frame interval;

first means for averaging said first and second video output signals to provide a first averaged video output signal;

second means for averaging said video input signal and said third video output signal to provide a second averaged video output signal;

third means for high pass filtering said first averaged video signal, for low pass filtering said second averaged video signal and for combining the filtered averaged signals to form an interpolated video output signal; and speed-up means coupled to said input means and to said third means for time compressing said first output signal, for time compressing said interpolated output signal and for interleaving lines of the time compressed signals to form a non-interlaced video output signal of double said given line rate.

* * * * *